(12) United States Patent
Chaiken et al.

(10) Patent No.: US 11,341,014 B2
(45) Date of Patent: May 24, 2022

(54) SYSTEM AND METHOD FOR GENERATING A HOTKEY IN A PRE-BOOT ENVIRONMENT

(71) Applicant: DELL PRODUCTS, LP, Round Rock, TX (US)

(72) Inventors: Craig L. Chaiken, Pflugerville, TX (US); Chun Yi Yang, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/062,108

(22) Filed: Oct. 2, 2020

(65) Prior Publication Data

US 2022/0107873 A1 Apr. 7, 2022

(51) Int. Cl.
*G06F 11/30* (2006.01)
*G06F 1/28* (2006.01)
*G06F 3/023* (2006.01)

(52) U.S. Cl.
CPC ............ *G06F 11/3055* (2013.01); *G06F 1/28* (2013.01); *G06F 3/0238* (2013.01); *G06F 11/3058* (2013.01)

(58) Field of Classification Search
CPC .... G06F 11/3055; G06F 11/3058; G06F 1/28; G06F 3/0238
See application file for complete search history.

(56) References Cited

U.S. PATENT DOCUMENTS

| | | | |
|---|---|---|---|
| 2007/0168574 A1 | 7/2007 | Martinez et al. | |
| 2009/0177901 A1* | 7/2009 | Chen | G06F 3/023 713/310 |
| 2009/0278679 A1 | 11/2009 | Dailey et al. | |
| 2011/0296152 A1* | 12/2011 | Freese | G06F 9/4403 713/2 |
| 2011/0314267 A1* | 12/2011 | Watanabe | G06F 9/4401 713/2 |
| 2013/0086372 A1* | 4/2013 | Kojo | G06F 9/4401 713/2 |
| 2014/0052977 A1* | 2/2014 | Lu | G06F 9/4401 713/2 |
| 2014/0257828 A1 | 9/2014 | Thornley et al. | |
| 2015/0365892 A1* | 12/2015 | Ma | H04W 52/0209 455/574 |
| 2019/0354685 A1* | 11/2019 | Tomasso | G06F 21/575 |
| 2020/0159302 A1 | 5/2020 | Chaiken et al. | |

* cited by examiner

*Primary Examiner* — Henry Tsai
*Assistant Examiner* — John B Roche
(74) *Attorney, Agent, or Firm* — Larson Newman, LLP

(57) ABSTRACT

An information handling system includes an embedded controller that subsequent to a determination that a power button is activated, may determine a sequence of unplugging a connector from a port within a time threshold and subsequently plugging the connector from the port within another time threshold. The embedded controller may determine a hotkey associated with the sequence of unplugging the connector from the port and subsequently plugging the connector to the port, and execute a function based on the hotkey.

20 Claims, 7 Drawing Sheets

SYSTEM AND METHOD FOR GENERATING A HOTKEY IN A PRE-BOOT ENVIRONMENT

FIELD OF THE DISCLOSURE

The present disclosure generally relates to information handling systems, and more particularly relates to generating a hotkey in a pre-boot environment.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Subsequent to a determination that a power button is activated, an embedded controller may determine a sequence of unplugging a connector from a port within a time threshold and subsequently plugging the connector from the port within another time threshold. The embedded controller may determine a hotkey associated with the sequence of unplugging the connector from the port and subsequently plugging the connector to the port, and execute a function based on the hotkey.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
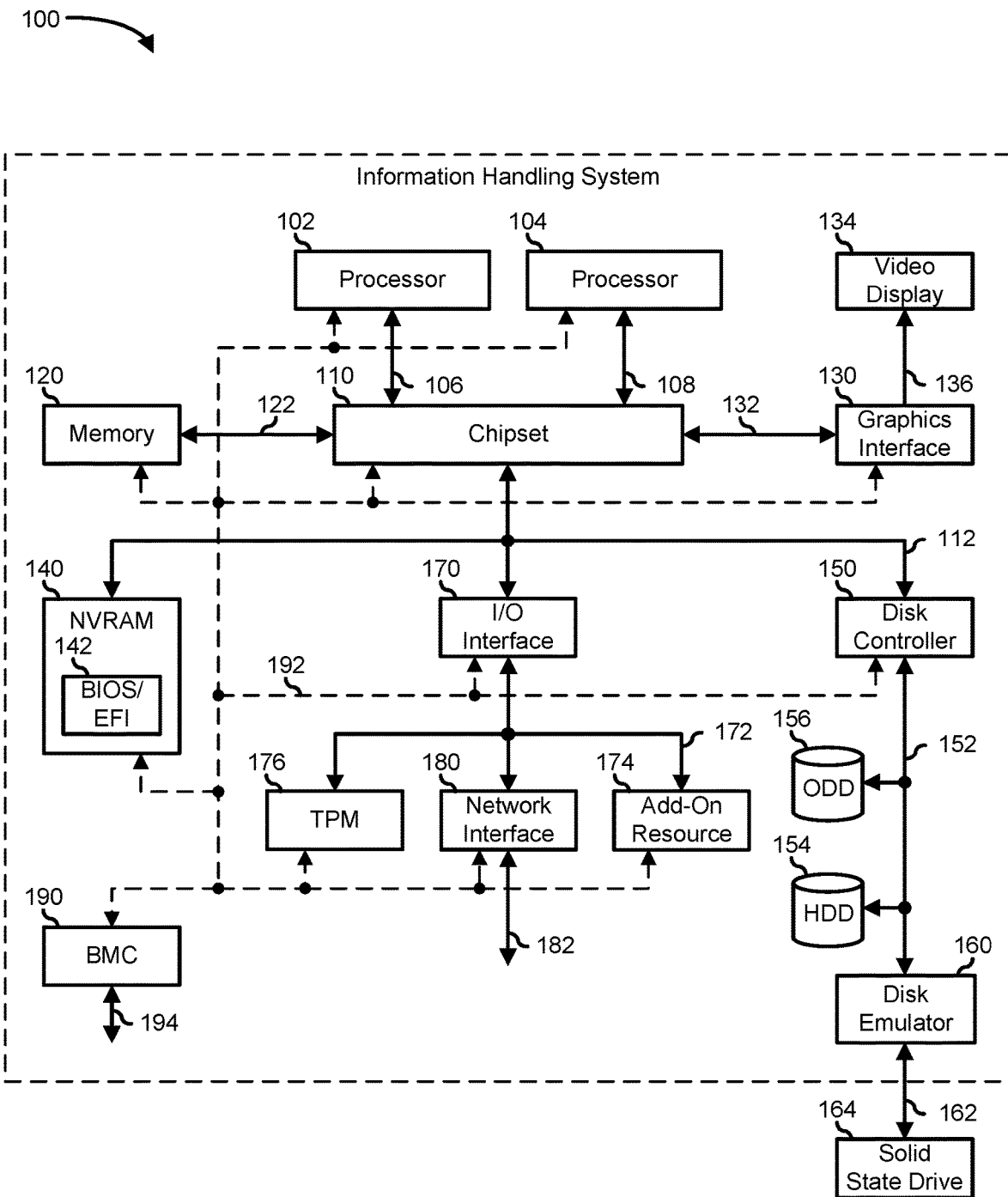
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random-Access Memory (SRAM) DIMMs, non-volatile DIMMs (NV-DIMMs), storage class memory devices, Read-Only Memory (ROM)

devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disk controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller. A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input/output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

One difficulty that arises with the diagnostic and recovery procedure of an information handling system before an operating system is operational is that if an error occurs before booting to the operating system, then the user may have little indication that an error occurred other than a blank screen. It is often desirable to change the flow of the boot process to initiate a diagnostic or some recovery procedure. Usually, this is done by pressing a hotkey, also referred to as a shortcut key, on a keyboard. Sometimes, the hotkey may be triggered before the operating system is operational. In general, with laptops, the embedded controller can read hotkeys from an integrated keyboard, even when the operating system is not functional. However on other information handling systems, where the keyboard is not integrated; such as desktops, tower workstations, All-In-One computers, and tablets; the keyboard is not accessible before the operating system is functional.

A power button may have been "overloaded" as a hotkey in some systems. For example, holding the power button for 5 seconds may be associated with one diagnostic function. Holding the power button for 10 seconds may have another function. Holding the power button for 25 seconds may have yet another function. Humans generally do not judge the passing of seconds accurately enough to distinguish holding the power button for 5 seconds vs holding the power button for 10 seconds or 25 seconds. Thus, overloading the power button based on the number of seconds the power button was held down is not the best option. Adding mechanical buttons on the body of the information handling system to support hotkeys is costly, particularly for low-frequency events like diagnostics and recovery. The present disclosure includes a system and method for generating a hotkey that may be used to initiate a diagnostic and/or recovery procedure in a pre-boot environment without overloading the power button or adding mechanical buttons on the body of the information handling system.

Figure 2:
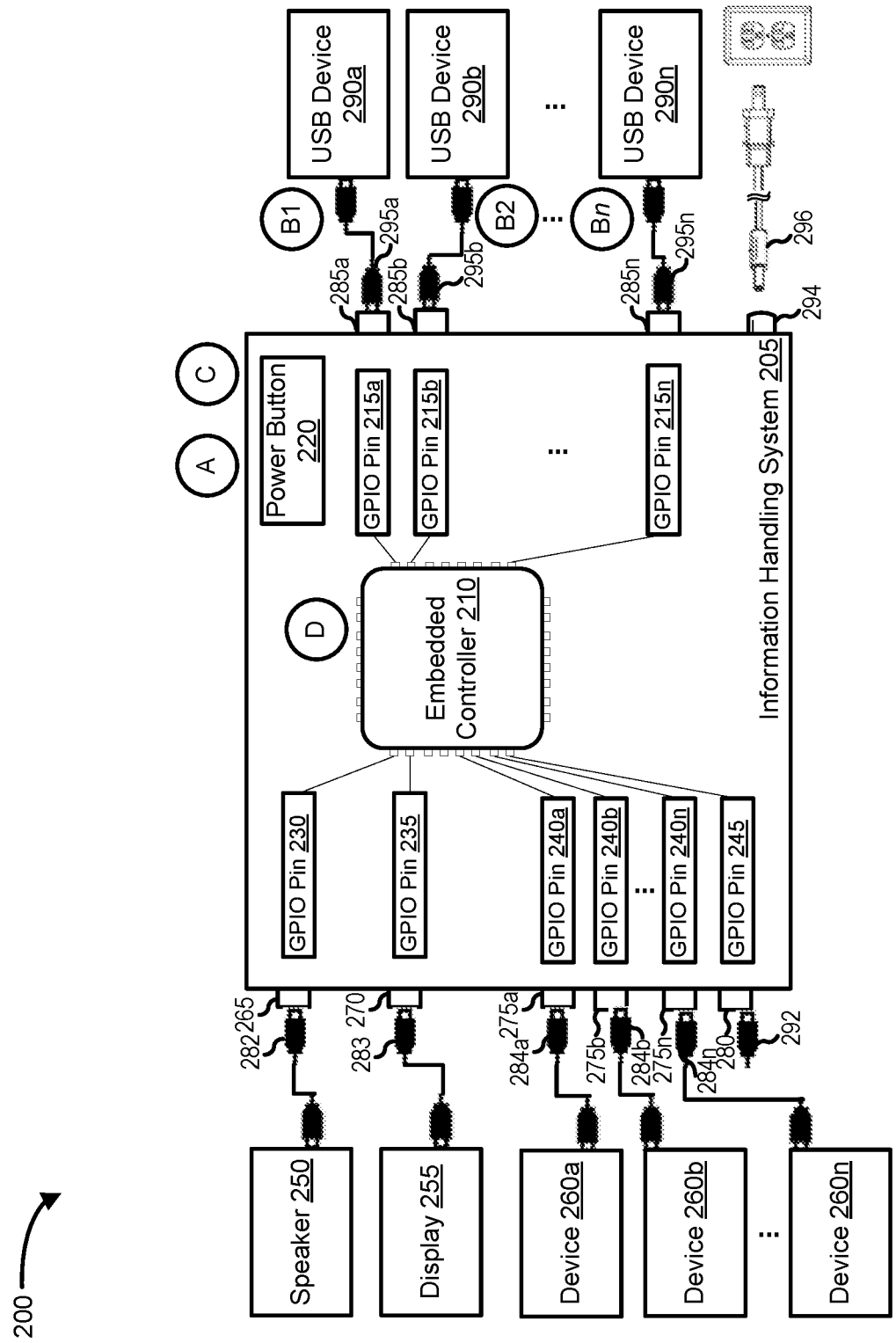
FIG. 2 is a block diagram illustrating an example of a system for generating a hotkey in a pre-boot environment, according to an embodiment of the present disclosure.

FIG. 2 shows an environment 200 where a system and method for generating a hotkey in a pre-boot environment may be implemented. Environment 200 includes an information handling system 205 which is similar to information handling system 100 of FIG. 1. Information handling system 205 includes an embedded controller 210, a power button 220, and one or more input/output ports or simply referred to as ports such as a USB port 285*a* to USB port 285*n*, a speaker port 265, a display port 270, a device port 275*a* to device port 275*n*, a network port 280, and an alternating current (AC) power port 294. Embedded controller 10 includes one or more a general-purpose input/output (GPIO) ports and one or more GPIO pins such as a GPIO pin 215*a* to GPIO pin 215*n*, a GPIO pin 230, a GPIO pin 235, a GPIO pin 240*a* to a GPIO pin 240*n*, and a GPIO pin 245. Environment 200 also includes a speaker 250, a display 255, a device 260*a* to a device 260*n*, and a USB device 290*a* to a USB device 290*n*. In addition, environment 200 includes one or more external connectors such as a speaker connector 282, a display connector 283, a connector 284*a* to a connector 284*n*, a USB connector 295*a* to USB connector 295*n*, and a network connector 292, and an AC power connector 296.

GPIO pin 215*a* is associated with USB port 285*a*. USB connector 295*a* which plugs into USB port 285*a* is associated with USB device 290*a*. GPIO pin 215*b* is associated with USB port 285*b*. USB connector 295*b* which plugs into USB port 285*b* is associated with USB device 290*b*. GPIO pin 215*n* is associated with USB port 285*n*. GPIO pin 230 is associated with speaker port 265. Speaker connector 282 which plugs into speaker port 265 is associated with speaker 250. GPIO pin 235 is associated with display port 270. Display connector 283 which plugs into display port 270 is associated with display 255. GPIO pin 240*a* is associated with device port 275*a*. Connector 284*a* which plugs into device port 275*a* is associated with device 260*a*. GPIO pin 240*b* is associated with port 275*b*. Connector 284*b* which plugs into port 275*b* is associated with device 260*b*. GPIO pin 240*n* is associated with device port 275*n*. Connector 284*n* which plugs into device port 275*n* is associated with device 260*n*. USB connector 295*n* which plugs into USB port 285*n* is associated with USB device 290*n*. AC port 295 is associated with AC power connector 296 that plugs into an AC power outlet.

Information handling system 205 may be one of the information handling systems with unintegrated keyboards such as a desktop, a server, a tower workstation, an All-In-One computer, tablet, workstations, etc. Information handling system 205 may include one or more ports for different peripherals and components, such as an input/output port, a video display adapter, a disk drive port, and input/output interfaces like for a keyboard or a mouse. For example, the ports may be of various types such as a mouse port, a keyboard port, a network port, a USB port, a parallel port, a serial port, a game port, an audio port, etc. USB port 285*a* to USB port 285*n* may include one or more USB ports of one or more types. For example, USB port 285*a* to USB port 285*n* may include a USB-A type, a USB B-Type, a USB C-type, a Micro-USB A, a micro USB-B, a USB mini-b, a USB 3.0 A-type, a USB 3.0 B-Type, a USB 3.0 micro B, etc. Information handling system 205 may be modified such that a signal, in particular a GPIO signal, is generated and detected at a port when an external connector is plugged in and is routed to a GPIO port or a GPIO pin on embedded controller 210. The GPIO signal is generated at the external connector to enable the system and method of the present disclosure to keep track of the external connector's or port status changes. To keep track of the external connector status changes, such as USB port status changes, embedded controller 210 firmware may configure USB controller to use a temporary address. If a port such as a USB port status changes state while power button 220 is pressed, a combination of the port number and the state change may be used to select or determine a hotkey event also referred simply as a hotkey. Thus, information handling system 205 may be configured to utilize an external connector into a potential pre-boot hotkey source.

Embedded controller 210 may be configured to execute a firmware to perform various steps of the methodology disclosed herein. For example, the firmware of embedded controller 210 may be configured to generate or determine a hotkey or combination of hotkeys. A hotkey may be trigged by a transition state in a GPIO port, a GPIO pin, or combination GPIO pins which are associated with a plug/unplug cycle of a connector. The plug/unplug cycle may also be an unplug/plug cycle. A GPIO pin is a generic pin whose value includes one of two voltage settings, high or low. The transition state may involve going from a high voltage to low voltage or from low voltage to high voltage based on the plug/unplug cycle of the connector. For example, the GPIO pin may have a high voltage if a connector is plugged in a port associated with the GPIO pin. Conversely, the GPIO pin may have a low voltage if the connector is not plugged in the port associated with the GPIO pin. The hotkey may be used to invoke or trigger a diagnostic or recovery function. Each GPIO port or GPIO pin may be associated with a hotkey or a combination of hotkeys. Conversely, each GPIO port or GPIO pin may be associated with a port. The hotkey or combination of hotkeys may be associated with a particular function, such as a diagnostic or recovery function.

Embedded controller 210 may be configured to detect when the power button is activated such as pressed and/or held down. After detecting that the power button is activated, embedded controller 210 may be configured to poll or monitor the GPIO ports and/or the GPIO pins for a certain period, to detect whether a connector is plugged in or unplugged from the input/output port. Embedded controller 210 may be configured to treat each one of the ports, connectors, GPIO pins, or GPIO ports as a single hotkey. In addition, embedded controller 210 may be configured to treat plugging a connector of a device such as speaker 250, display 255, device 260*a* to a port while holding the power button as a hotkey which in turn triggers a function associated with the device. For example, plugging in a connector for speaker 250 while holding down power button 220 may be treated hotkey which triggers a speaker diagnostic function.

In addition, embedded controller 210 may be configured to determine the plug/unplug cycle also referred to as a connect/disconnect cycle. The plug/unplug cycle may refer to the connector being plugged in and unplugged from the input/output port within a time threshold also referred to as a detection delay. The time threshold may be set by the manufacturer or an administrator. For example, the default value may be set to three seconds. The plug/unplug cycle may also refer to the connector being unplugged from and plugged into the input/output port within the time threshold. Each time a plug/unplug cycle completes, embedded controller 210 may be configured to monitor for another plug/unplug cycle until a maximum number of plug/unplug cycles are reached or the time threshold is reached without the user plugging in or unplugging the connector or the plug/unplug cycle occurring. The number or sequence of plug/unplug cycles may be used to determine the associated hotkey value which may be used to alter the flow of the boot process. For example, one plug/unplug cycle may be treated as a hotkey value of one while two plug/unplug cycles may be treated as a hotkey value of two. A hotkey value of one may trigger a diagnostic test while a hotkey value of two may generate another diagnostic test. In addition, embedded controller 210 may be configured to monitor a plurality of input/output ports in parallel to detect a plug/unplug cycle. This allows environment 200 to support a plurality of hotkeys without adding a long detection delay.

If the information handling only has one port, embedded controller 210 may be configured to extend the time threshold to monitor for the plug/unplug cycle. In addition, embedded controller 210 may be configured to monitor for one or more plug/unplug cycles or a sequence of plug/unplug cycles, wherein the connector may be plugged and/or unplugged to the input/output port according to a sequence. The sequence of plugging and/or unplugging the connector may be associated with a unique hotkey. Also, an AC power port such as AC power 296 may be used to determine the hotkey, wherein embedded controller may be configured to monitor whether AC power connector 296 is plugged into or unplugged from AC power port 294. As such, environment 200 may supports several or a combination of hotkeys using the same connector.

A hotkey may be determined when power button 220 is actuated such as when it is pressed, held down, or released while information handling system 205 is in a shutdown or S5 state. The hotkey may also be determined when power button 220 is actuated while information handling system 205 is completely off, in a sleep state, or a hibernate state. The hotkey may also be determined during the boot process or when information handling system 205 transitions from a sleep state or a hibernate state to a working state. The hotkey may trigger a serviceability process which includes a diagnostic or recovery process. The information handling system may use the hotkey to determine a serviceability process to be performed. The hotkey or a sequence of hotkeys may be associated with a globally unique identifier (GUID) which may be used to determine the serviceability process to be performed.

Embedded controller 210 may be configured to detect the insertion and removal of a connector from a port. For example, embedded controller 210 may detect the insertion and removal of a USB connector from a USB port while power button 220 is actuated. When embedded controller 210 detects that power button 220 is pressed and held down, embedded controller 210 may proceed with monitoring whether a hotkey is initiated. The monitoring for the hotkey or sequence of hotkeys may continue until a maximum number of hotkeys or sequence of hotkeys is reached. The monitoring may be performed using one or more algorithms. For example, the algorithm may be different for an information handling system that has one port vs. an information handling system with more than one port. If the information handling system only has one port, then the algorithm may monitor the sequence of plug/unplug cycle of the connector to the port within a time threshold or until the power button is released. A hotkey may be associated with a particular sequence which then triggers a function. For example, a hotkey that triggers a liquid crystal display (LCD) built-in-self-test is may be determined if the connector is unplugged and plugged back to the port once while another hotkey that triggers a hard drive built-in-self-test may be determined if the connector is unplugged and plugged back into the port twice.

A hotkey may also be associated with a particular port which then also triggers a function. By simply plugging a device while holding the power button may trigger a hotkey for the connector associated with the device. The hotkey in turn invokes or triggers a function such as a diagnostic or a recovery function. For example, unplugging and plugging the connector from a display port while holding down the power button may trigger an LCD built-in-self-test while unplugging and plugging back in a connector of a keyboard from a USB-port trigger a keyboard built-in-self-test. During a catastrophic failure, embedded controller 210 may be configured to replace infinite waits and select a response to the catastrophic failure based on the hotkey event. When the BIOS detects a catastrophic error, the BIOS reads the connection state of one or more ports such as USB port. If a port status change is detected, the combination of the port number and port stage change may be used to select a hotkey event. For example, a particular USB port plug/unplug event may select one of the following events: initiate a dump of forensic data to an NV-RAM or a serial port, force a reboot or a shutdown, initiate a retry of the last event, etc.

FIG. 2 is annotated with a series of letters A-B1/Bn-D. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, power button 220 may be pressed and held down by a user. Any external port of information handling system 205 may be used to determine a hotkey or a combination of hotkeys. Plugging/unplugging a connector to one or more ports may be associated with a hotkey or a combination of hotkeys which may be associated with one or more diagnostic or recovery functions.

While power button 220 is pressed, at stage B 1, if a connector is plugged to a port, then the user may unplug a connector from the port. Otherwise, if the connector is not plugged to the port, then the user may plug the connector to the port. For example, the user may unplug USB connector 295a from USB port 285a. The user may proceed to stage B2 or to stage Bn where the user may plug/unplug one or more connectors from one or more ports. For example, if USB connector 295b is plugged to USB port 285b, then the user may unplug USB connector 295b from USB port 285b. If USB connector 295b is unplugged from USB port 285b, then USB connector 295b is plugged to USB port 285b. At stage C, the user may release the power button. At stage D, information handling system 205 may transition into a diagnostic mode, wherein embedded controller 210 performs one or more functions based on the number of connectors that were plugged and/or unplugged. Embedded controller 210 may also perform the one or more functions based on the sequence of the plug/unplug cycle of one or more connectors. Embedded controller 210 may be configured to execute a locally stored copy of the firmware to execute the one or more functions.

Figure 3:
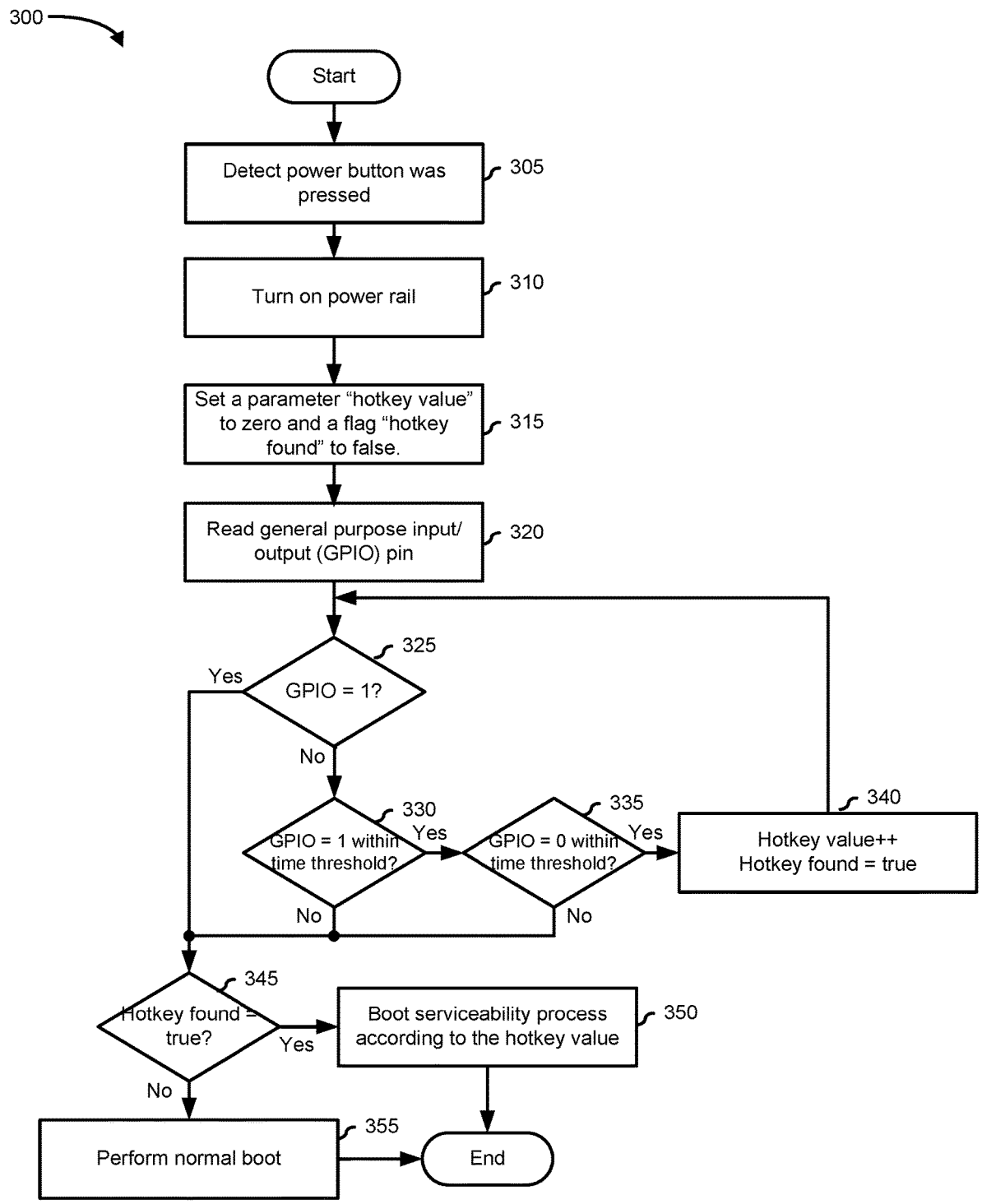
FIG. 3 is a flowchart illustrating an example of a method for generating a hotkey in a pre-boot environment, according to an embodiment of the present disclosure.

FIG. 3 shows a method 300 for determining a hotkey during pre-boot. While embodiments of the present disclosure are described in terms of environment 200 of FIG. 2, it should be recognized that other systems may be utilized to perform the described method. Method 300 typically starts at block 305 where the method detects that a power button is pressed and/or held down while the information handling system is in shutdown power state.

The method proceeds to block 310 where the method turns on a power rail that powers a GPIO port, a GPIO pin, or a port. Power rails of an information handling system are generally organized into a topology referred to as a power tree. Each primary power rail may have one or more subordinate power rails that branch off. A primary power rail may supply power to memory, CPU, a display device.

Subordinate power rails may be used to power to one or more ports and/or GPIO pins and GPIO ports.

The method proceeds to block 315 where a parameter "hotkey value" which identifies a detected hotkey may be initially set to zero. In addition, a parameter "hotkey found" which identifies whether a hotkey is detected is initially set to false. The parameter "hotkey found" may be a flag that is set to true if the hotkey is detected. The hotkey may also have a unique identifier and/or associated with the unique identifier of the connector, the port, the GPIO pin, or the GPIO port.

The method proceeds to block 320 where the method reads one or more GPIO pins. Each GPIO pin is associated with one or more connectors. Each connector may be associated with a hotkey, a combination of hotkeys, or a sequence of hotkeys. Each GPIO pin may be configured to detect whether a connector is connected and/or disconnected. In another embodiment, the method reads one or more GPIO ports, wherein each GPIO port is associated with one or more connectors.

The method proceeds to decision block 325 where the method determines whether a value in a GPIO pin is equal to one. The GPIO pin may have a value of one or zero. The value of the GPIO pin may be equal to one if a connector is plugged into the port associated with the GPIO pin. The value of the GPIO pin may be equal to zero if the connector is not plugged in the port associated with the GPIO pin. In another embodiment, the value of the GPIO pin may be either high or low, wherein high is equivalent to one and low equivalent to zero. If the method determines that the GPIO pin is equal to the one, then the "YES" branch is taken, and the method proceeds to decision block 345. If the method determines that the GPIO pin is not equal to one, then the "NO" branch is taken, and the method proceeds to decision block 330.

At decision block 330, the method determines whether the GPIO pin value is equal to one within a time threshold. If the method determines that the GPIO pin is equal to one within the time threshold, then the "YES" branch is taken, and the method proceeds to decision block 335. If the method determines that the GPIO pin is not equal to 1 within the time threshold, then the "NO" branch is taken, and the method proceeds to decision block 345.

At decision block 335, the method determines whether the value of the GPIO pin is equal to zero within a time threshold. If the method determines that the value of the GPIO pin is equal to zero within the time threshold, then the "YES" branch is taken, and the method proceeds to block 340. If the method determines that if the value of the GPIO pin is not equal to zero within the time threshold, then the "NO" branch is taken, and the method proceeds to decision block 345.

At block 340, the method increments the current value of the parameter "hotkey value." The method also sets the value of the parameter "hotkey found" to true. At decision block 345, the method determines whether the hotkey is detected. The hotkey is detected if the parameter "hotkey found" is equal to true. If the method detects a hotkey, then the "YES" branch is taken, and the method proceeds to block 350. If the method does not detect a hotkey, then the "NO" branch is taken, and the method proceeds to block 355 where the method proceeds to a normal boot process.

At block 350, the method proceeds to perform a serviceability process according to the hotkey value. The serviceability process may be predetermined or configured by the manufacturer or an administrator of the information handling system. For example, if hotkey associated with the keyboard is detected, the method performs a boot serviceability process that is operable to perform one or more diagnostic tests or one or more built-in-self-tests such as interrupt control test, a memory test, a flash memory test, a register test, etc. The built-in-self-test process can be provided as a software module, application, process, or other forms of encoded logic that can be used by the information handling system. For example, if the user plugged/unplugged display connector 283 to display port 270, then embedded controller 210 may perform the LCD build-in-self-test on display 255. Display 255 may be a flat panel display or other display devices. In another example, if in addition to plugging/unplugging display connector 283, the user plugged/unplugged speaker connector 282 to speaker port 265, then embedded controller 210 may perform a speaker built-in-self-test on speaker 250. After performing the normal boot process or the serviceability process, the method ends.

Figure 4:
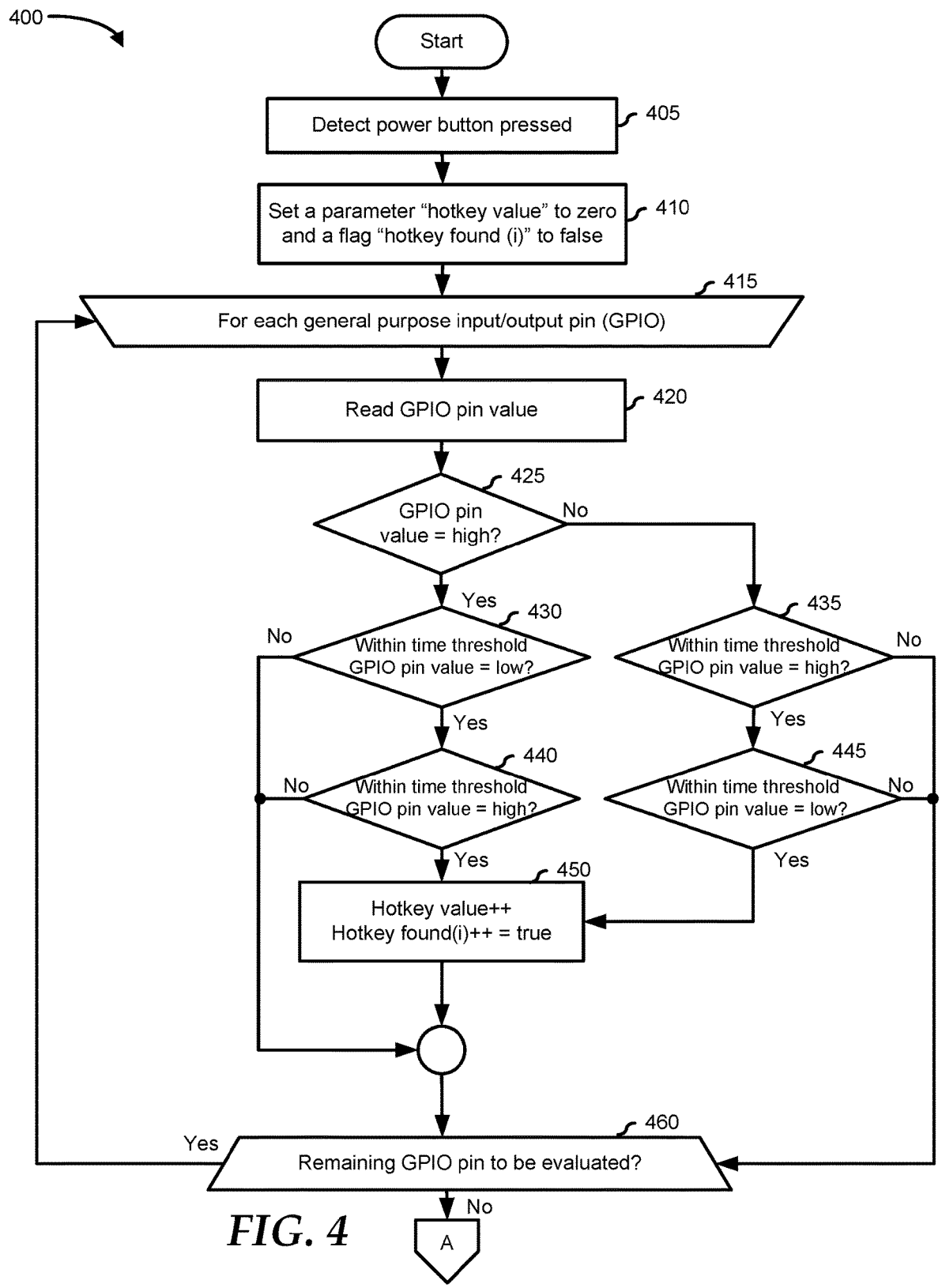
FIG. 4 and FIG. 5 are flowcharts illustrating an example of a method for generating a hotkey in a pre-boot environment, according to an embodiment of the present disclosure.

FIG. 4 shows a method 400 for generating or determining a hotkey during pre-boot. While embodiments of the present disclosure are described in terms of environment 200 of FIG. 2, it should be recognized that other systems may be utilized to perform the described method. Method 400 typically starts at block 405 where the method detects that a power button of an information handling system is pressed. The method may also turn on a power rail associated with GPIO pins, GPIO ports, or the external ports for the connectors. The method proceeds to block 410, where the method sets a parameter that keeps track of hotkeys detected, such as "hotkey value" to zero. For each detected hotkey, the parameter hotkey value is incremented. The method may also set a parameter that keeps track of whether a hotkey is detected for each GPIO pin, such as "hotkey found" to false. The parameter "hotkey found" is set to true when a hotkey is detected.

The method proceeds to block 415 where the method evaluates the GPIO pins in the information handling system. The present disclosure refers to a GPIO pin being evaluated as a "current GPIO pin." In another embodiment, the method evaluates the GPIO ports in the information handling system.

At block 420, the method reads the value of the current GPIO pin. The method then proceeds to decision block 425 where the method determines whether the value of the current GPIO pin is high. The value of the current GPIO pin may be high if a connector is plugged to a port associated with the current GPIO pin. The value of the current GPIO pin may be low if the connector is not plugged to the port associated with the current GPIO pin. If the value of the current GPIO pin is high, then the "YES" branch is taken, and the method proceeds to decision block 430. If the value of the current GPIO pin is low, then the "NO" branch is taken, and the method proceeds to decision block 435.

At decision block 430, the method determines whether the value of the GPIO pin changes to low within the time threshold. For example, the user unplugged the connector within the time threshold. If the value of the GPIO pin changes to low within the time threshold, then the "YES" branch is taken, and the method proceeds to decision block 440. If the value of the GPIO pin does not change to low within the time threshold, then the "NO" branch is taken, and the method proceeds to block 460.

At decision block 435, the method determines whether the value of the GPIO pin changes to high within the time threshold. For example, the user plugged the connector within the time threshold. If the value of the GPIO pin changes to high within the time threshold, then the "YES"

branch is taken, and the method proceeds to decision block 445. If the value of the GPIO pin does not change to high within the time threshold, then the "NO" branch is taken, and the method proceeds to decision block 445.

At decision block 440, the method determines whether the value of the GPIO pin changes to high within the time threshold. For example, the user plugged the connector that was unplugged above within the time threshold. If the value of the GPIO pin changes to high within the time threshold, then the "YES" branch is taken, and the method proceeds to block 450. If the value of the GPIO pin does not change to high within the time threshold, then the "NO" branch is taken, and the method proceeds to block 460.

At decision block 445, the method determines whether the value of the GPIO pin changes low within the time threshold. For example, the user unplugged the connector that was plugged above within the time threshold. If the value of the GPIO pin changes to low within the time threshold, then the "YES" branch is taken, and the method proceeds to block 450. If the value of the GPIO pin does not change to low within the time threshold, then the "NO" branch is taken, and the method proceeds to block 460.

At block 450, the method increments the current value of the parameter "hotkey value." The method also sets the incremented value of the parameter "hotkey found" to true. At block 460, the method determines if there is another GPIO pin to be evaluated. If there is another GPIO pin to be evaluated, then the "YES" branch is taken, and the method proceeds to block 415. If there is no remaining GPIO pin to be evaluated, then the method proceeds to block 505 of FIG. 5.

Figure 5:
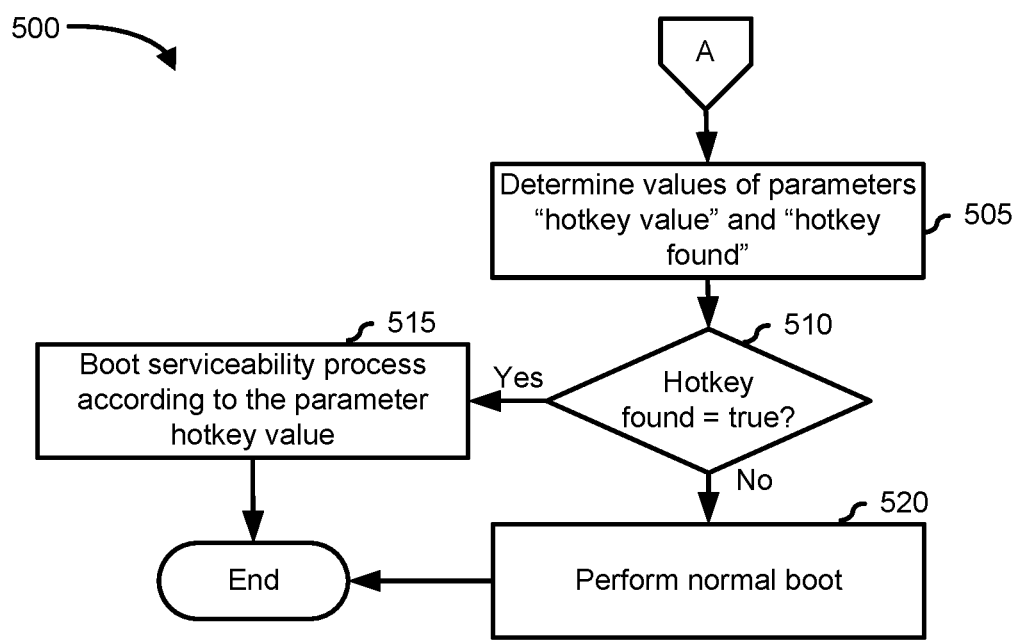

FIG. 5 shows a method 500 which is a continuation of method 400 of FIG. 4. Method 500 starts at block 505 where the method determines the values of the parameter "hotkey value" and the parameter "hotkey found" for each GPIO pin. The method proceeds to decision block 510 where the method determines if at least one parameter "hotkey found" is equal to true. If at least one parameter "hotkey found" has a value equal to true, then the "YES" branch is taken, and the method proceeds to block 515. If there is no parameter "hotkey found" that has a value equal to true, then the method proceeds to block 520.

At block 515, the method proceeds to perform one or more of the serviceability processes based on the value of the parameter "hotkey value." At block 520, the method proceeds with the normal boot process. After the serviceability process or the normal boot process, the method ends.

Figure 6:
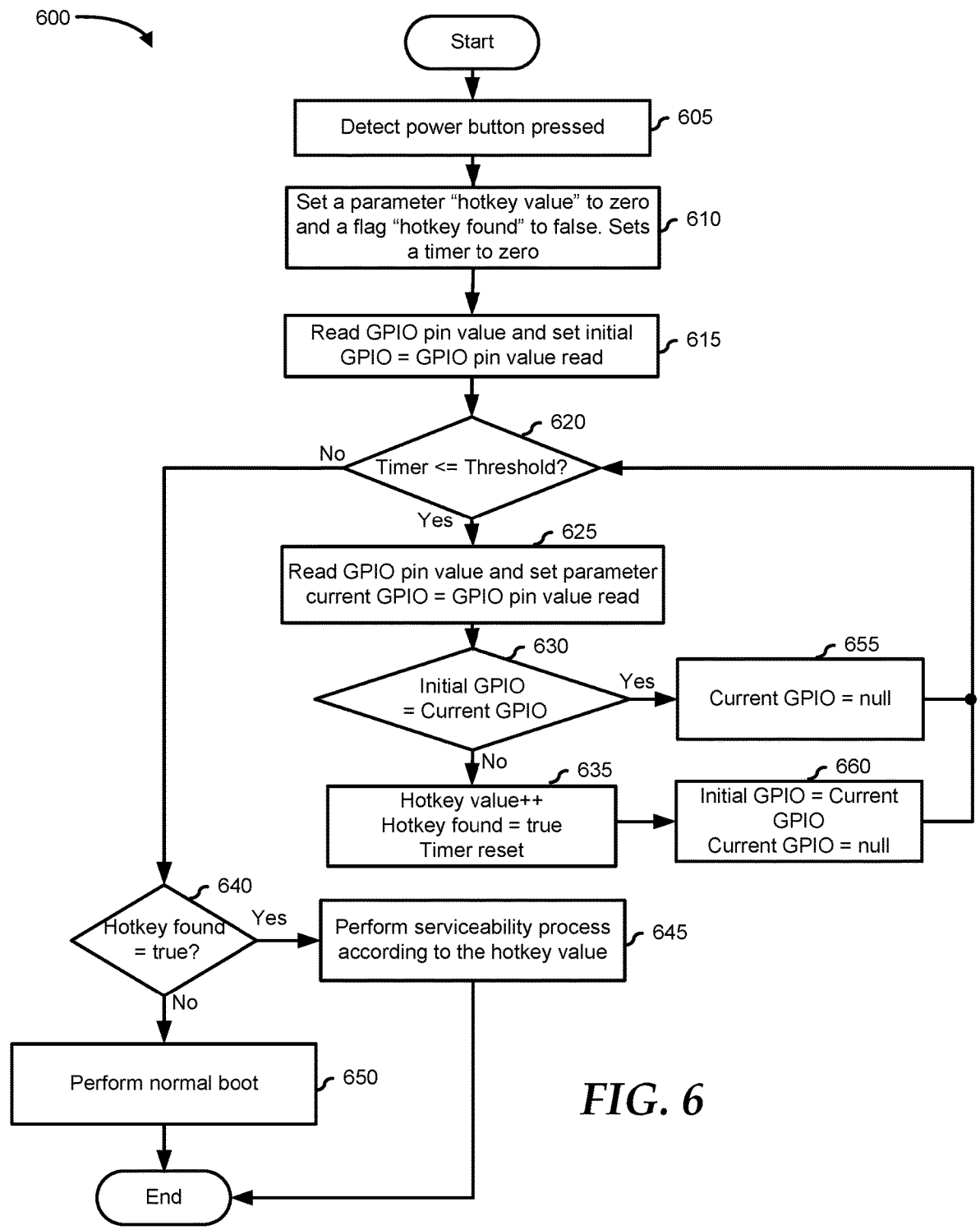
FIG. 6 is a flowchart illustrating an example of a method for generating a hotkey in a pre-boot environment, according to an embodiment of the present disclosure.

FIG. 6 shows a method 600 for generating a hotkey during pre-boot. While embodiments of the present disclosure are described in terms of environment 200 of FIG. 2, it should be recognized that other systems may be utilized to perform the described method. Method 600 may be performed concurrently for each GPIO pin or GPIO port. Method 600 typically starts at block 605 where the method detects that a power button is pressed and/or held down during the boot process. The method may also turn on a power rail associated with a GPIO pin or port. The method proceeds to block 610 where the method sets a parameter "hotkey value" to zero and a parameter "hotkey found" to false. The method may also set a timer to zero. The method proceeds to block 615 where the method reads a value of a GPIO pin and sets the parameter "initial GPIO value" equal to the value read.

The method proceeds to decision block 620 where the method determines if the timer is less than or equal to a timer threshold. If the timer is less than or equal to the timer threshold, then the "YES" branch is taken, and the method proceeds to block 625. If the timer is not less than or equal to the timer threshold, then the "NO" branch is taken, and the method proceeds to decision block 640.

At block 625, the method reads the value of the GPIO pin and sets a parameter "current GPIO value" with the value read from the GPIO pin. The method proceeds to decision block 630 where the method determines whether the "initial GPIO value" is equal to the "current GPIO value." If the "initial GPIO value" is equal to the "current GPIO value" then the "YES" branch is taken, and the method proceeds to block 655 where the method may set the value of the parameter current GPIO to null and proceed to decision block 620. If the "initial GPIO value" is not equal to the "current GPIO value" then the "NO" branch is taken, and the method proceeds to block 635.

If the "initial GPIO value" is equal to the "current GPIO value", then there is no change in the value of the GPIO pin and thus no change in the state of the port. For example, if there was a connector plugged into the port at block 615, then the connector is still plugged into the port at block 625. If the "initial GPIO value" is not equal to the "current GPIO value" then there is a change in the state of the port. For example, if there was a connector plugged into the port at block 615, then the connector was unplugged from the port at block 625. At block 635, the method increments parameter "hotkey value." The method also sets the parameter "hotkey found" to true. In addition, the method resets the timer. The method proceeds to block 660 where the method may set the value of the parameter initial GPIO to the value of the parameter current GPIO. In addition, the method may set the value of the parameter current GPIO to null.

At decision block 640, the method determines if the value of the parameter "hotkey found" is equal to true. If the method determines that the value of the parameter "hotkey found" is equal to true, then the "YES" branch is taken, and the method proceeds to block 645. If the method determines that the value of the parameter "hotkey found" is not equal to true, then the "NO" branch is taken, and the method proceeds to block 650 where the method performs the normal boot process. At block 645, the method proceeds with the normal boot process. At block 650 the method performs a serviceability process according to the value of the parameter "hotkey value". In particular, the method may perform a diagnostic process and/or a recovery process. After performing the serviceability process and the normal boot process, the method ends.

Figure 7:
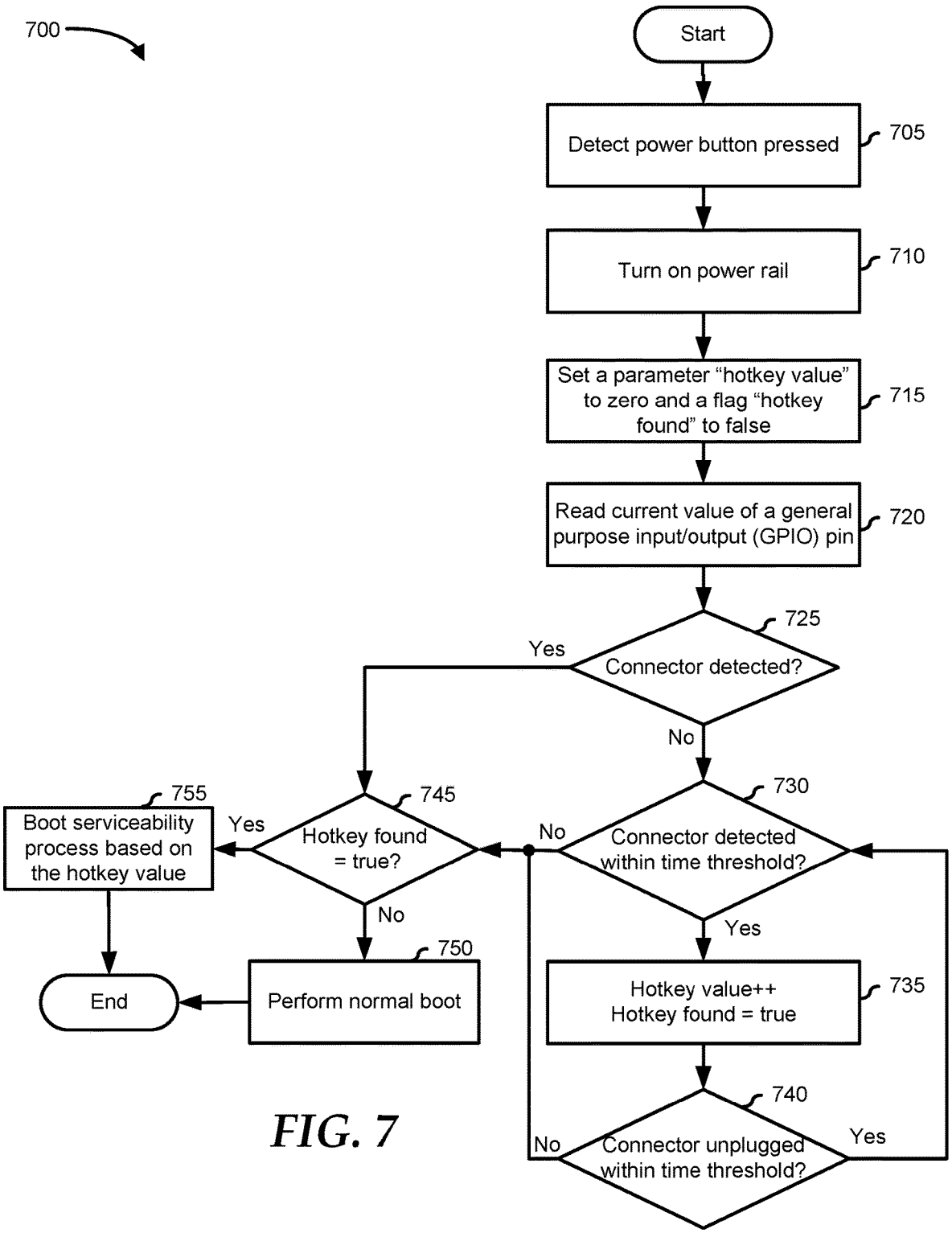
FIG. 7 is a flowchart illustrating an example of a method for generating a hotkey in a pre-boot environment, according to an embodiment of the present disclosure.

FIG. 7 shows a method 700 for generating a hotkey during pre-boot may be implemented. While embodiments of the present disclosure are described in terms of environment 200 of FIG. 2, it should be recognized that other systems may be utilized to perform the described method. Method 700 can be performed on several external connectors concurrently upon exit of a shutdown, hibernation, or a sleep state. In this case, each connector can be treated as a unique hotkey. Accordingly, a dedicated GPIO pin mapped to the connector can also be treated as the unique hotkey. Each connector and GPIO pin may be associated with a GUID. The connector used to trigger the hotkey may invoke or trigger a function that is related to the purpose of the connector. In this case, wherein each connector triggers a hotkey, there is no need to unplug the connector. For example, the video connector may trigger an LCD built-in-self-test when plugged in during the power button activation without unplugging the video connector.

Method 700 typically starts at block 705 where the method detects that the power button is pressed and held down while the information is exiting the shutdown, sleep, or hibernation state. The method proceeds to block 710, the method turns on a power rail that power the GPIO pins.

At block 715, the method set a parameter such as "hotkey value" that tracks the hotkeys detected to zero. The parameter keeps track of which hotkey is triggered by a connector. For example, it keeps track of whether a hotkey associated with a display monitor and/or a microphone is detected. The method may also set a flag that keeps track of whether a hotkey was triggered, such as "hotkey found" to false. The flag is set to true when a hotkey is triggered. At block 720, the method obtains the current value a GPIO pin using its identifier, name, type, or other properties. The current value of the GPIO pin may reflect whether or not a connector cable is plugged to the port associated with the GPIO pin. In one embodiment, the current value of the GPIO pin may be high if the connector is plugged in. Conversely, the current value of the GPIO pin may be low if the connector is unplugged. The method proceeds to decision block 725.

At decision block 725, the method determines whether a connector is detected, that is plugged into the port associated with the GPIO pin. If the method detects the connector is plugged into the port associated with the GPIO pin, then the "YES" branch is taken, and the method proceeds to decision block 745. If the method does not detect that the connector is plugged into the port associated with the GPIO pin, then the "NO" branch is taken, and the method proceeds to decision block 730.

At decision block 730, the method determines whether the connector is detected, that is plugged into the port associated with GPIO pin within a time threshold. If the method detects the connector within the time threshold, then the "YES" branch is taken, and the method proceeds to block 735. If the method does not detect the connector within the time threshold, then the "NO" branch is taken, and the method proceeds to decision block 745.

At block 735, the method increments the parameter "hotkey value" and sets the flag "hotkey found" to true. The method proceeds to decision block 740. At decision block 740, the method determines the connector is unplugged from the port within the time threshold. If the method detects that the connector is unplugged from the port within the time threshold, then the "YES" branch is taken, and the method proceeds to decision block 730. If the method does not detect that the connector is unplugged from the port within the time threshold, then the "NO" branch is taken, and the method proceeds to decision block 745.

At decision block 745, the method determines whether a hotkey is detected. In particular, the method determines whether the flag "hotkey found" is equal to true. If the method determines that the hotkey is detected, then the "YES" branch is taken, and the method proceeds to block 755. If the method determines that the hotkey is not detected, then the "NO" branch is taken, and the method proceeds to block 750.

At block 750, the method proceeds with the normal boot process. At block 755, the method proceeds with the serviceability process based on the value of the parameter "hotkey value." For example, the value of the "hotkey value" may invoke a particular diagnostic or recovery function. After performing either block 750 or block 755, then the method ends.

Although FIG. 3, FIG. 4, FIG. 5, FIG. 6, and FIG. 7 show example blocks of method 300, method 400, method 500, method 600, and method 700 in some implementation, method 300, method 400, method 500, method 600, and method 700 may include additional blocks, fewer blocks, different blocks, or differently arranged blocks than those depicted in FIG. 3, FIG. 4, FIG. 5, FIG. 6, and FIG. 7. Additionally, or alternatively, two or more of the blocks of method 300, method 400, method 500, method 600, or method 700 may be performed in parallel. For example, block 715 and block 720 of method 700 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
 monitoring an information handling system, by an embedded controller, to detect whether a power button is pressed during a boot process of the information handling system;

in response to detecting that the power button is pressed, monitoring a port to determine whether a hotkey is triggered;

determining whether the hotkey has been triggered based on detecting whether a connector is plugged into the port while the power button is pressed during the boot process within a time threshold, wherein the detecting whether the connector is plugged into the port is based on a value of a general-purpose input/output (GPIO) pin associated with the port; and in response to determining that the hotkey has been triggered while the power button is pressed, executing a function based on the hotkey.

2. The method of claim 1, further comprising in response to the detecting that the power button is pressed, turning a power rail associated with the GPIO pin.

3. The method of claim 1, wherein the function is a diagnostic function.

4. The method of claim 1, wherein the function is a recovery function.

5. The method of claim 1, further comprising monitoring the information handling system to detect a release of the power button.

6. The method of claim 1, further comprising determining whether another hotkey is triggered based on detecting whether another connector is plugged into another port while the power button is pressed during the boot process.

7. The method of claim 1, wherein the executing the function is performed when the power button is released.

8. The method of claim 7, wherein the executing the function is performed after a maximum number of hotkeys is reached.

9. An information handling system, comprising:
a port; and
an embedded controller associated with the port, the embedded controller configured to:
subsequent to a determination that a power button is activated, determine a sequence of unplugging a connector from the port within a time threshold and subsequently plugging the connector back to the port within another time threshold;
determine a hotkey associated with the sequence of unplugging the connector from the port and subsequently plugging the connector back to the port while the power button is activated; and
execute a function based on the hotkey.

10. The information handling system of claim 9, wherein the embedded controller is further configured to turn on a power rail associated with the port subsequent to the determination that the power button is activated.

11. The information handling system of claim 9, wherein the power button is activated when the power button is pressed and held down during a boot process of the information handling system.

12. The information handling system of claim 9, wherein the power button is activated when it is pressed and held down during a transition to a wake-up state of the information handling system.

13. The information handling system of claim 9, wherein the function is executed when the power button is released.

14. A method comprising:
monitoring an information handling system, by an embedded controller, to detect whether a power button in pressed during a boot process;
in response to detecting that the power button has been pressed during the boot process, reading a value of a general-purpose input/output (GPIO) pin associated with a port to determine whether a connector is not plugged in the port while the power button is pressed;
in response to determining that the connector is not plugged in the port, determining whether the connector is subsequently plugged in the port within a time threshold;
in response to determining that the connector is subsequently plugged in the port within the time threshold while the power button is pressed, determining a hotkey associated with the port; and
executing a function associated with the hotkey.

15. The method of claim 14, wherein the function associated with the hotkey is a diagnostic function.

16. The method of claim 14, wherein the function associated with the hotkey is a recovery function.

17. The method of claim 14, wherein the hotkey is associated with the GPIO pin.

18. The method of claim 14, further comprising determining a combination of hotkeys associated with a plurality of connectors being plugged and subsequently unplugged from a plurality of ports within the time threshold.

19. The method of claim 14, further comprising determining whether another connector is unplugged in another port while the power button is pressed.

20. The method of claim 19, further comprising determining whether the another connector is plugged in the another port within the time threshold subsequent to the determining that the another connector is unplugged.

* * * * *